United States Patent
Bowden et al.

(12)

(10) Patent No.: US 6,997,015 B2
(45) Date of Patent: Feb. 14, 2006

(54) EUV LITHOGRAPHY GLASS STRUCTURES FORMED BY EXTRUSION CONSOLIDATION PROCESS

(75) Inventors: Bradley F. Bowden, Edison, NJ (US); Seann Bishop, Raleigh, NC (US); Kenneth E. Hrdina, Horseheads, NY (US); John F. Wight, Jr., Corning, NY (US)

(73) Assignee: Corning Incorporated, Corning, NY (US)

( * ) Notice: Subject to any disclaimer, the term of this patent is extended or adjusted under 35 U.S.C. 154(b) by 471 days.

(21) Appl. No.: 10/302,364

(22) Filed: Nov. 22, 2002

(65) Prior Publication Data

US 2003/0221454 A1    Dec. 4, 2003

Related U.S. Application Data

(60) Provisional application No. 60/333,957, filed on Nov. 27, 2001.

(51) Int. Cl.
*C03B 19/06*    (2006.01)

(52) U.S. Cl. .......................... 65/17.6; 65/17.3; 65/183; 65/401

(58) Field of Classification Search ................ 65/17.3, 65/17.4, 17.6, 183, 401; 264/604, 638, 639
See application file for complete search history.

(56) References Cited

U.S. PATENT DOCUMENTS

| | | | |
|---|---|---|---|
| 3,790,654 A | | 2/1974 | Bagley |
| 4,622,057 A | * | 11/1986 | Chyung et al. ............... 65/17.2 |
| 4,789,389 A | * | 12/1988 | Schermerhorn et al. ...... 65/390 |
| 4,902,216 A | | 2/1990 | Cunningham et al. |
| 5,999,254 A | | 12/1999 | Seibert et al. |
| 6,118,150 A | | 9/2000 | Takahashi |
| 6,188,150 B1 | * | 2/2001 | Spence ........................ 310/12 |
| 6,548,142 B1 | | 4/2003 | Kar et al. |
| 6,763,682 B1 | * | 7/2004 | Sayce et al. .................. 65/17.4 |
| 6,796,143 B1 | * | 9/2004 | Clasen et al. ................. 65/17.3 |

FOREIGN PATENT DOCUMENTS

| | | |
|---|---|---|
| EP | 1106582 A2 | 6/2001 |
| WO | 00/48828 * | 8/2000 |
| WO | WO 01/07967 | 2/2001 |
| WO | WO 01/08163 | 2/2001 |

\* cited by examiner

*Primary Examiner*—Sean Vincent
(74) *Attorney, Agent, or Firm*—Walter M. Douglas

(57) ABSTRACT

The invention discloses a method for forming substantially striae-free glass substrates that are suitable for optical applications, including use in forming optical elements or structures such as mirrors and platen stage structures that can be used, for example, in EUV lithography. The method includes forming a mixture of silica soot, binder, lubricant and solvent. The homogenized mixture is then extruded through a slit die or mask into a flat planar pre-form, and the extruded pre-form is then consolidated by heating into a substantially full density, substantially striae-free lithography glass substrate structure. The consolidated perform has a substantially uniform coefficient of thermal expansion and is also substantially void free.

36 Claims, 4 Drawing Sheets

EUV LITHOGRAPHY GLASS STRUCTURES FORMED BY EXTRUSION CONSOLIDATION PROCESS

RELATED APPLICATIONS

This application claims the benefit of U.S. Provisional Application, Ser. No. 60/333,957, filed Nov. 27, 2001 entitled EUV LITHOGRAPHY GLASS STRUCTURES FORMED BY EXTRUSION CONSOLIDATION PROCESS, by Bishop et al.

BACKGROUND OF THE INVENTION

1. Field of the Invention

The invention relates generally to methods for forming Extreme Ultraviolet (EUV) Lithography optical elements such as EUV mirrors substrates and EUV photomask substrates. More specifically, the invention relates to methods for forming high quality lithography glass structures by extrusion and consolidation of a pre-form to provide a thermally stable ultra low expansion glass lithography substrate.

2. Background

Ultra low expansion glass, such as a type sold by Corning Incorporated, Corning, N.Y. under the trade name ULE® glass is formed by a process known as flame hydrolysis. Chemical vapors are introduced into a gas-oxygen burner at approximately 1700° C. The combustion reaction forms sub-micron sized molten particles. The burners are generally aligned over a rotating table in a refractory furnace where the particles are collected and fused into a large, dense, solid boule of glass. Typical materials used to make such glass includes high-purity titanium-containing feedstock, such as titanium alkoxide, titanium tetrachloride or titanium isopropoxide and high purity silicon-containing feedstock such as octamethylcyclotetrasiloxane or silicon tetrachloride. During the combustion process, titanium doped silica soot is formed. Much of the soot is deposited on the rotating table, but some of the soot becomes a waste product of the silica forming process. The soot typically has a very high purity and very small particle size. Much of the soot is deposited on the rotating table, but some of the soot is not deposited and becomes an exhausted waste product of the silica forming process which is collected in a baghouse. The soot typically has a very high purity and very small particle size.

SUMMARY OF THE INVENTION

One aspect of the invention is a method for forming glass which includes forming a mixture of silica soot, binder, lubricant and solvent. The mixture is extruded into a pre-form, and the extruded pre-form is then consolidated by heating into a substantially full density, substantially striae-free glass. Preferably the mixture is extruded through an elongated longitudinal singular slit to form a substantially planar pre-form which is preferably consolidated into a substantially planar body full density striae-free glass substrate. The extruded pre-form is substantially void-free geometry and the consolidated glass is substantially full density void-free geometry.

The invention includes a method for forming EUV lithography glass substrates. The method includes homogeneously mixing a mixture of titanium doped silica glass soot particles, binder, lubricant and solvent; extruding the homogenized mixture through a singular extrusion slit into a solid void-free pre-form; and heating the pre-form to consolidate the pre-form into a full density void-free titanium doped solid glass having a homogeneous uniform CTE. Preferably the silica particles have a titanium dopant weight percent level within the range from about 6 wt. % $TiO_2$ to about 9 wt. % $TiO_2$ and said full density titanium doped glass has a homogeneous titanium dopant level, said homogeneous titanium dopant level in the range from 6 wt. % $TiO_2$ to about 9 wt. % $TiO_2$, more preferably 6 to 8 wt. % $TiO_2$, and most preferably 6.8 to 7.5 wt. % $TiO_2$. Preferably the homogeneous CTE is in the range of +30 ppb/° C. to −30 ppb/° C. at 20–26° C., more preferably +20 ppb/° C. to −20 ppb/° C. at 20–26° C., and most preferably +10 ppb to −10 ppb at 20–26° C. Preferably the CTE has a variation in coefficient of thermal expansion $\leq 10$ ppb/° C., most preferably $\leq 5$ ppb/° C.

The invention includes forming an EUV lithography glass substrate by forming a mixture of silica soot, binder, lubricant and solvent; extruding the homogeneous mixture into a pre-form; and heating the pre-form to consolidate the pre-form into a full density substantially striae-free glass.

The invention includes a method for forming an EUV lithography glass substrate. The invention includes homogeneously mixing a mixture of titanium doped silica glass particles, binder, lubricant and solvent; extruding the homogeneous mixture through an extrusion slit into a solid pre-form; and heating the pre-form to consolidate the pre-form into a full density, substantially striae-free titanium doped solid glass having a homogeneous CTE.

The invention includes forming a void-free geometry glass substrate by homogeneously mixing a mixture of titanium doped silica glass particles, binder, lubricant and solvent; extruding the homogeneous mixture through an extrusion slit into a solid void-free pre-form; and heating the pre-form to consolidate the pre-form into a full density, substantially striae-free titanium doped solid glass having a homogeneous CTE with said homogeneous CTE in the range of +20 ppb/° C. to −20 ppb/° C. at 20–26° C.

Preferably the titanium doped silica glass soot particles consist essentially of fused silica with titanium dopant and the consolidated glass body structure consists essentially of fused silica homogeneously doped with titanium dopant and has a homogeneous CTE in the range of +20 ppb/° C. to −20 ppb/° C. at 20–26° C.

Other aspects and advantages of the invention will be apparent from the following description and the appended claims.

DETAILED DESCRIPTION

The invention includes making thermally stable EUV lithography structure objects such as optical mirror element substrate structures and platen stage structures. PCT patent publication WO0108163 A1, EUV SOFT X-RAY PROJECTION LITHOGRAPHIC METHOD SYSTEM AND LITHOGRAPHY ELEMENTS of CORNING INCORPORATED by Davis et al. (Application No. US0018798 US, Filed Jul. 10, 2000, A1 Published Feb. 1, 2001) and WO0107967 A1, EUV SOFT X-RAY PROJECTION LITHOGRAPHIC METHOD AND MASK DEVICES of CORNING INCORPORATED by Davis et al. (Application No. US0019060 US, Filed Jul. 13, 2000, A1 Published Feb. 1, 2001) which are hereby incorporated by reference shows EUV lithography mirror element and mask structures. U.S. Pat. No. 6,118,150 (Feb. 13, 2001) of the EUV LLC by Paul Spence which is hereby incorporated by reference shows a lightweight high stiffness EUV lithography stage platen structure. U.S. Pat. No. 5,999,254 (Dec. 7, 1999) of Schott Glas by Seibert et al. which is hereby incorporated by reference shows a lithography photomask supporting plate structure.

Figure 1:
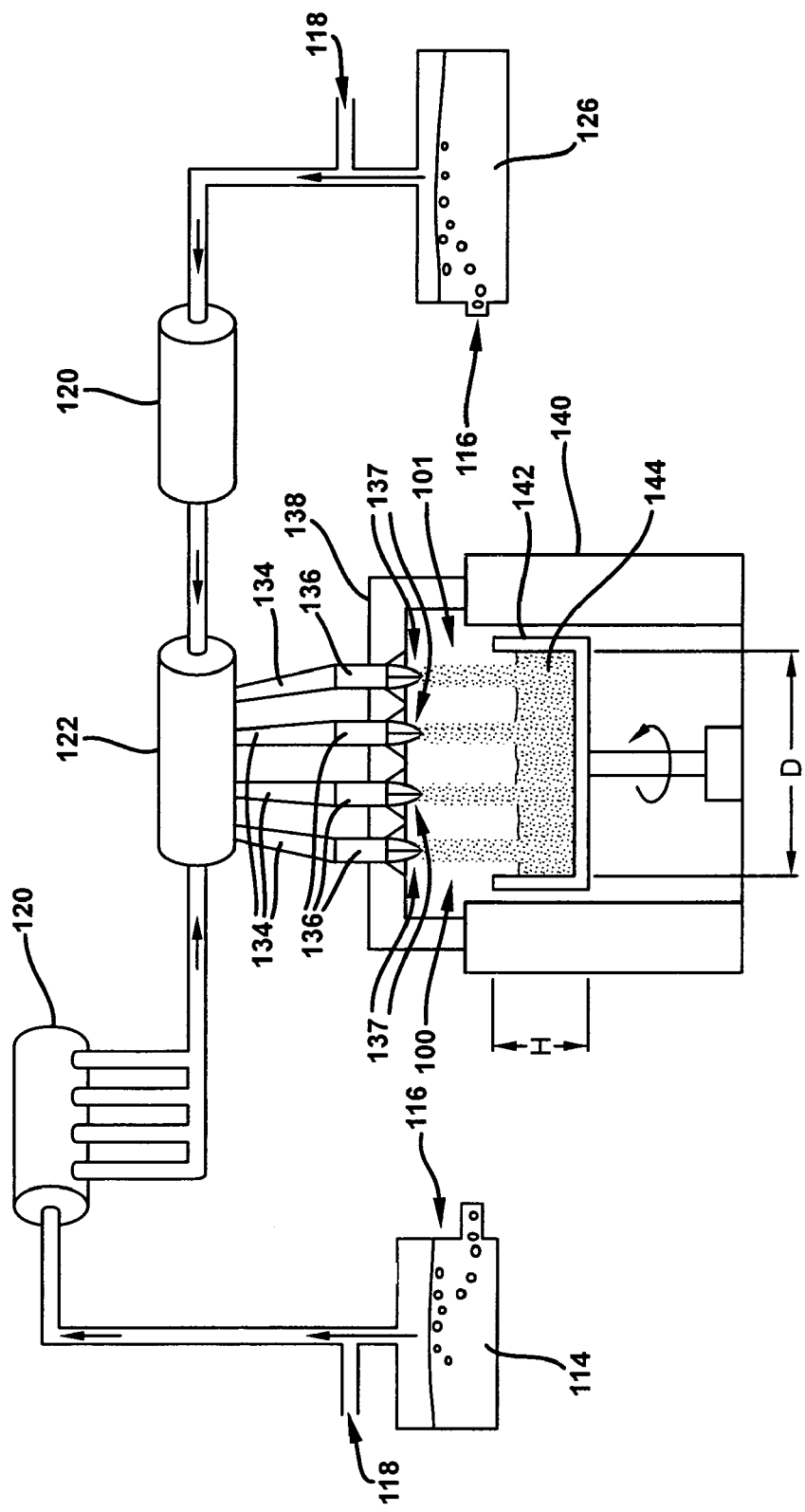
FIG. 1 shows a typical flame hydrolysis system which may be used to form soot for use with the invention.

An example of a flame hydrolysis system which can make silica glass particle soot usable with various embodiments of the invention is shown in FIG. 1. Preferably, a high purity silicon-containing feedstock 114 and a high purity titanium-containing feedstock 126 are delivered to a conversion site 100 to be converted into soot 100. The hydrolysis system may include, for the purpose of making glass structures unrelated to the invention, a revolving zircon collection cup 142 in a refractory zircon furnace 140 wherein a glass body 144 is formed by deposition of the soot 101. The high purity silicon-containing feedstock 114 may be octamethylcyclotetrasiloxane and the high purity titanium-containing feedstock 126 may be titanium isopropoxide, although these materials are not intended to limit the scope of the invention. A nitrogen-inert carrier gas 116 is bubbled through the feedstocks 114, 126, and a nitrogen-inert carrier gas 118 is added to the feedstock vapor/carrier mixtures to facilitate delivery of the mixtures to the conversion site 100, through a distribution system 120 and manifold 122. Preferably the feedstock mixtures are mixed in the manifold 122 to form a substantially homogeneous gaseous titanium-doped $SiO_2$ precursor mixture. The precursor mixture is delivered through conduits 134 to conversion site burners 136, which are typically mounted in an upper portion 138 of the furnace 140. Burner flames 137 convert the feedstock mixture (precursor) into silica soot. The amount of titanium dopant may be changed by adjusting the amount of titanium feedstock 126 delivered. The conversion site 100 may not deposit all the soot 101 onto the glass body 144. Waste byproduct amounts of the soot 101 may be collected and used in various embodiments of the invention. In a preferred alternative the soot is intentionally produced as the main product such as described in pending U.S. patent application Ser. No. 09/458,898, filed Dec. 10, 1999, entitled Process For Producing Silica Soot, of Kar et al. and EP 106582, Silica soot and process for producing it Corning Incorporated, Inventor(s): Gitimoy, Kar, Corning Incorporated; Chunzhe, Charles Yu, Application No. EP00122419, Filed Oct. 13, 2000, A2 Published Jun. 13, 2001, which are incorporated herein by reference in entirety, and then the soot can be used in various embodiments of the invention.

The foregoing example of a flame hydrolysis system is not meant to limit the invention as to the source of silica soot used in various embodiments of the invention. The various embodiments of the invention preferably have sufficient purity, preferred chemical composition and preferred particle size of the silica soot. Other systems and methods for generating silica glass particles may be used in embodiments of the invention. One other such methods such as sol-gel and solution chemistry processes. Preferably the titanium is doped into the silica glass at the time of silica glass soot generation. Alternatively atomic scale mixing of titania and silica may be obtained through solution chemistry.

Typically, the titanium content of the silica soot will be in a range of about zero to ten percent by weight. Typically, the soot particle size will be in a range of about 0.005 microns to 0.4 microns, with an average particle size of about 0.2 microns. Preferably the silica soot glass particles have a dopant level of 6 wt. % $TiO_2$ to about 9 wt. % $TiO_2$, more preferably 6 to 8 wt. % $TiO_2$, and most preferably 6.8 to 7.5 wt. % $TiO_2$.

Figure 2:
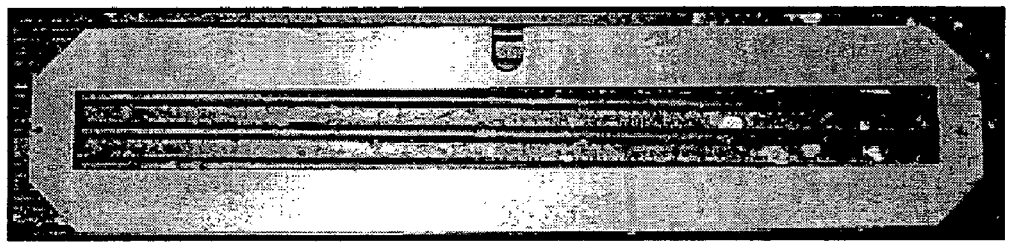
FIG. 2 shows an example of a singular slit extrusion mask used to make structures according to the invention.
Figure 3:
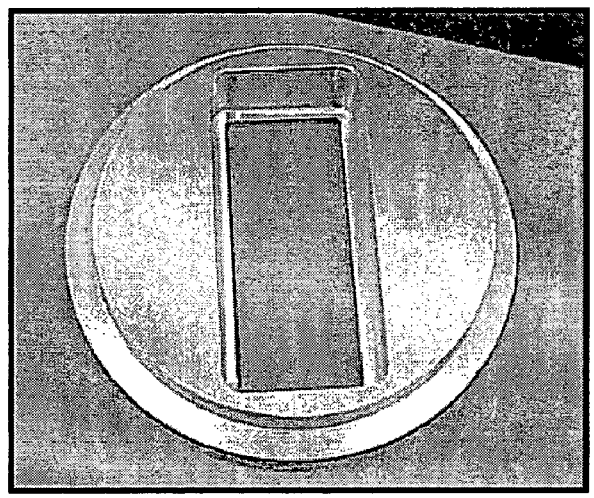
FIG. 3 shows an example of a singular slit extrusion die used to make structures according to the invention.

Silica soot having the prefelTed particle size and purity may then be used in various embodiments of the invention to form substantially striae-free glass. The soot particles are homogeneously mixed with a binder, a lubricant and a solvent to provide a homogeneous mixture. Preferably the mixture is mulled to ensure proper mixing. Forming a homogeneous mixture of the soot, binder, lubricant and solvent includes physically blending and working the mixture into a homogeneous consistency. Forming the homogeneous mixture preferably includes dry blending the mixture, mulling the mixture, evacuating the mixture to remove air, and forcing the mixture through a plurality of small orifices such as an array of holes or through a screen. The homogeneous blended worked mixture is then extruded through a slit die or mask to provide a desired pre-form geometry. An example of an extrusion slit mask is shown in FIG. 2. An example of an extrusion slit die is shown in FIG. 3. Preferably the homogeneous mixture is extruded through an elongated longitudinal singular slit to form a substantially planar pre-form which can be consolidated into a substantially planar body full density striae-free glass substrate. The extruded pre-form preferably has a substantially void-free geometry and the consolidated glass has a substantially full density void-free geometry. Examples of methods and dies/masks for extruding the mixture into various structures are disclosed, for example, in U.S. Pat. No. 3,790,654 issued to Bagley and in U.S. Pat. No. 4,902,216 issued to Cunningham et al.

After extrusion, the extruded pre-form is dried, typically in air, to remove excess solvent. The dried pre-form is then heated to remove the binder ("debinding"). After debinding, the pre-form can be purified. Typically, purification includes heating the pre-form in a chlorine atmosphere. Impurities in the pre-form material thus form chlorides. The chlorides become volatile and can then be removed by an inert carrier gas. After purification, the pre-form is heated and consolidated to form a fully dense, striae-free glass. The glass thus formed will have a substantially uniform coefficient of thermal expansion. Any gaseous inclusions or similar defects in the glass may be removed by hot isostatic pressing.

Figure 4:
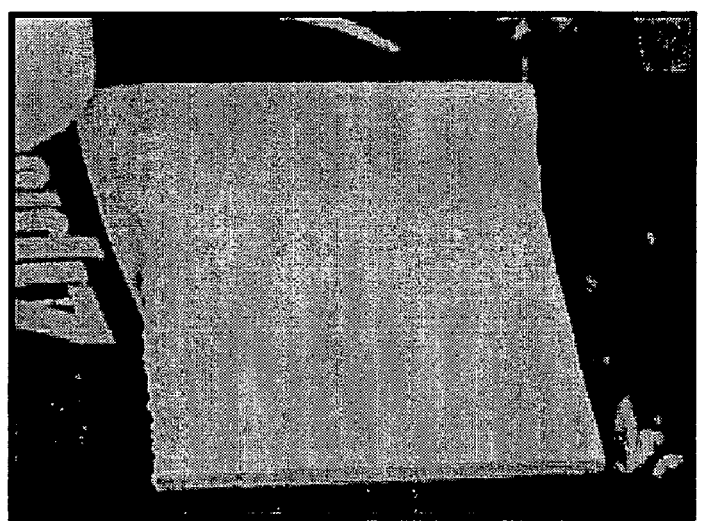
FIG. 4 shows an extruded solid preform (dimensions of 6.25 inches by 0.5 inches by 4.5 inches) extruded through a an extrusion mask as shown in FIG. 2 in accordance with the invention.
Figure 5:
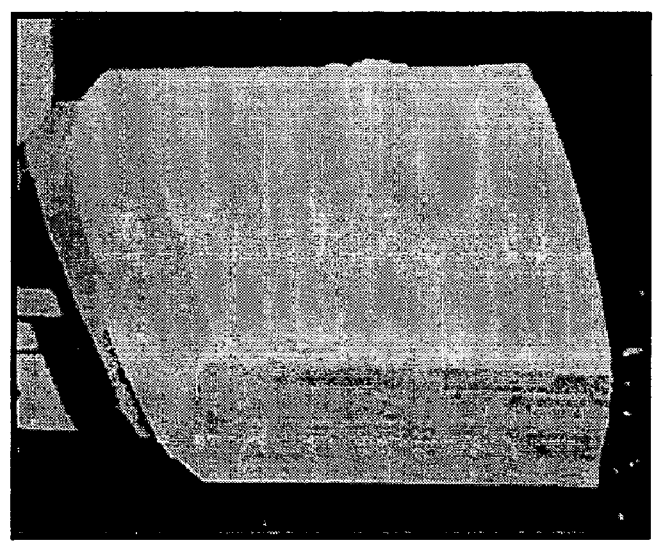
FIG. 5 shows an extruded solid preform (dimensions of 1.75 inches by 3.75 inches by 4 inches ) extruded through an extrusion die as shown in FIG. 3 in accordance with the invention.
Figure 6:
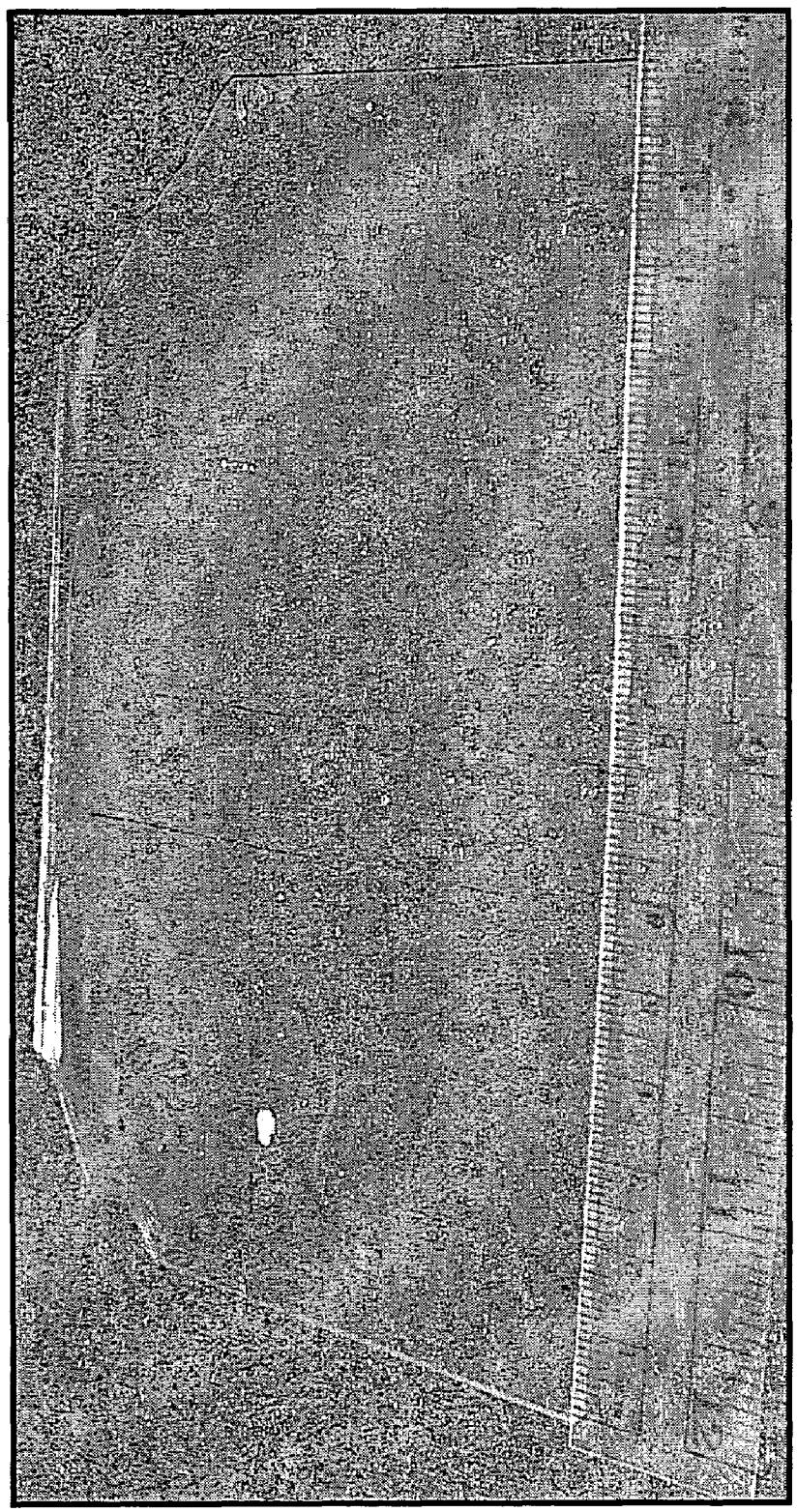
FIG. 6 shows a consolidated solid glass substrate formed by consolidating a preform as shown in FIG. 4 in accordance with the invention.

In one example of a glass made according to the invention, 65 pounds (29.51 kg) of titanium-doped silica soot with a titanium dopant weight percent level within the 6 wt. % $TiO_2$ to 9 wt. % $TiO_2$ range was mixed and mulled with 118 g of oleic acid, 740 g of methocellulose, and 7.29 kg of water. During mulling, an additional 1.46 kg of water was added. Prior to extruding through the extrusion slit the forming of the homogeneous mixture included the sequence of blending, mulling, evacuating, multiple forcings of the mixture through an array of small orifices, to provide a beneficial and preferred homogenized paste mixture with randomized soot particles. In this example, about half of the mixture was extruded through a mask such as shown in FIG. 2. The other half of the mixture was extruded through a die such as shown in FIG. 3. Each pre-form resulting from the extrusion was air-dried. After air-drying, each pre-form was heated to 1050 degrees C. to remove excess solvent and binder. The pre-forms were then heated to 825 degrees C. in a vacuum, purified in a chorine atmosphere, and then purged in a helium atmosphere. After purification and purging, the pre-forms were consolidated by heating to about 1300 degrees C. to form a substantially striae-free glass. FIG. 4 shows a solid planar preform prior to consolidation (dimensions of 6.25 inches by 0.5 inches by 4.5 inches) that had been extruded through a mask as shown in FIG. 2. FIG. 6 shows a consolidated solid glass planar substrate formed by consolidating a preform as shown in FIG. 4. FIG. 5 shows a solid planar preform (dimensions of 1.75 inches by 3.75 inches by 4 inches) prior to consolidation that was extruded through a die as shown in FIG. 3.

Preferably consolidation is achieved with a consolidation temperature in the range of 1300 to 1700° C. The preferred consolidation temperature is in the range of 1400 to 1650° C., and more preferably 1400 to 1500° C. In a preferred embodiment when the consolidation temperature does not approach 1650° C., such as in the 1400 to 1500° C. range, the method includes a short term decrystallization heat treatment directly following the longer term consolidation at the consolidation temperature with the short term decrystallization heat treatment having a temperature in the range of 1650 to 1700° C. and a short duration sufficient to melt crystals that may have developed in the glass during the longer term consolidation.

The invention includes the method for forming EUV lithography glass substrates. The method includes homogeneously mixing a mixture of titanium doped silica glass particles, binder, lubricant and solvent; extruding the homogeneous mixture through a singular extrusion slit into a solid void-free pre-form; and heating the pre-form to consolidate the pre-form into a full density void-free titanium doped solid glass having a homogeneous uniform CTE. Preferably the silica particles are soot particles with a titanium dopant weight percent level within the range from about 6 wt. % $TiO_2$ to about 9 wt. % $TiO_2$. Preferably the silica particles have a titanium dopant weight percent level within the range from about 6 wt. % $TiO_2$ to about 9 wt. % $TiO_2$ and said full density titanium doped glass has a homogeneous titanium dopant level, said full density consolidated glass homogeneous titanium dopant level in the range from 6 wt. % $TiO_2$ to about 9 wt. % $TiO_2$, more preferably 6 to 8 wt. % $TiO_2$, and most preferably 6.8 to 7.5 wt. % $TiO_2$. Preferably the homogeneous CTE is in the range of +10 ppb/° C. to −10 ppb/° C. at 20–26° C., preferably with the CTE having a variation in coefficient of thermal expansion ≦10 ppb/° C., most preferably ≦5 ppb/° C., preferably with the homogeneous CTE in the range of +5 ppb/° C. to −5 ppb/° C. at 20–26° C.

The invention includes forming a void-free geometry glass substrate by homogeneously mixing a mixture of titanium doped silica glass particles, binder, lubricant and solvent; extruding the homogeneous mixture through an extrusion slit into a solid void-free pre-form; and heating the pre-form to consolidate the pre-form into a full density, substantially striae-free titanium doped solid glass having a homogeneous CTE with said homogeneous CTE in the range of +20 ppb/° C. to −20 ppb/° C. at 20–26° C. Preferably said silica particles are soot with a titanium dopant weight percent level within the range from about 6 wt. % $TiO_2$ to about 9 wt. % $TiO_2$ and said full density titanium doped glass has a homogeneous titanium dopant level, said homogeneous titanium dopant level in the range from 6 wt. % $TiO_2$ to about 9 wt. % $TiO_2$. More preferably the silica particles have a titanium dopant weight percent level within the range from about 6 to 8 wt. % $TiO_2$ and said full density titanium doped glass has a homogeneous titanium dopant level in the range from 6 to 8 wt. % $TiO_2$. Most preferably the homogeneous titanium dopant level is 6.8 to 7.5 wt. wt. % $TiO_2$. Preferably the homogeneous CTE is in the range of +10 ppb/° C. to −10 ppb/° C. at 20–26° C., and most preferably in the range of +5 ppb/° C. to −5 ppb/° C. at 20–26° C. Preferably the homogeneous CTE has a variation in coefficient of thermal expansion ≦10 ppb/° C., most preferably ≦5 ppb/° C.

The invention includes forming an EUV lithography glass substrate by forming a mixture of silica soot, binder, lubricant and solvent; extruding the homogeneous mixture into a pre-form; and heating the pre-form to consolidate the pre-form into a full density substantially striae-free glass.

The invention includes a method for forming an EUV lithography glass substrate. The invention includes homogeneously mixing a mixture of titanium doped silica glass particles, binder, lubricant and solvent; extruding the homogeneous mixture through an extrusion slit into a solid pre-form; and heating the pre-form to consolidate the pre-form into a full density, substantially striae-free titanium doped solid glass having a homogeneous CTE. The extrusion slit is an elongated longitudinal singular slit so that the extruded pre-form is a solid geometry body free of voids with preferably flat planar shape with the thickness height less than the width of the pre-form body which corresponds with the length of the slit, and preferably the thickness height is also less than the length of the pre-form body which corresponds with the amount of homogeneous mixture extruded out through the slit. The pre-form extruded through the slit is preferably void-free in that the preform does not have predetermined intentionally formed empty spaces or gaps and the body is full density geometry in terms of the absence of such empty space voids and gaps.

Preferably the solvent is pure $H_2O$. Preferably the lubricant is oleic acid. Preferably the binder is methocellulose.

After extruding the homogenized mixture to form a pre-form, the pre-form is dried to remove excess solvent and purified prior to consolidation heating into a consolidated full density glass to ensure a high purity glass that preferably consists essentially of the silica with titanium dopant originating from the starting soot. Purifying the pre-form includes cleansing the pre-form with a heated purifying reactive gas treatment which volatizes non-silica-titanium glass impurities in the preform, preferably includes a cleansing halide gas, most preferably the reactive gas treatment is a chlorine containing atmosphere. Cleansing with the purifying reactive gas treatment includes and is preferably concluded with purging gas treatments to improve the purification of the pre-form and removal of non-silica-titanium glass impurities. Purifying preferably includes the gaseous diffusion removal of alkali and iron impurities, preferably with a high temperature chlorine gas treatment. Purifying preferably includes chlorine atmosphere exposure at an elevated heated cleansing temperature and purging with a purge gas. The purge gas is preferably an inert gas of the same type that can be used with the chlorine compound. In a preferred alternative the purge gas includes oxygen, preferably purified $O_2$. Preferably the reactive gas is chlorine and the inert gas is helium. In a preferred alternative the reactive gas includes oxygen, preferably a mixture of $Cl_2$ and $O_2$. In preferred embodiments the pre-form is oxygenated prior to consolidation into a glass body. The pre-form is oxygenated with an oxygen containing atmosphere with oxygen diffusing into the pre-form and reacts with $Ti^{3+}$ and lower oxidation states of titanium and converts such to the $Ti^{4+}$ oxidation state. Such conversion of trivalent titanium by oxidizing to tetravalent titanium by heating in an oxidizing atmosphere is preferred prior to the consolidation heating in a vacuum. Such oxygen treatment insures the clarity of the consolidated glass and avoids the occurrence of a bluish black discoloration of the consolidated glass. Preferably trivalent titanium is oxidized to tetravalent titanium by heating in an oxidizing atmosphere prior to vacuum heating consolidation.

In a preferred embodiment gaseous defect inclusions in the consolidated glass are removed and prevented by hot isostatic pressing. Preferably the hot isostatic pressing utilizes Ar or He.

The invention includes making an EUV lithography photomask glass substrate by mixing a mixture of a silica soot with a titanium dopant weight percent level within the range from 6 wt. % $TiO_2$ to 9 wt. % $TiO_2$, a binder, a lubricant and a solvent; extruding the homogenized mixture to provide a flat planar pre-form; oxygenating the pre-form, consolidating the flat planar pre-form in a vacuum to provide a consolidated flat planar silica glass substrate with a titanium dopant weight percent level within the range from 6 wt. % $TiO_2$ to 9 wt. % $TiO_2$, and hot isostatic pressing said consolidated flat planar silica glass substrate to provide an EUV lithography photomask glass substrate free of gaseous defect inclusions and having a CTE in the range of +20 ppb/° C. to −20 ppb/° C. at 20–26° C.

Preferably the titanium doped silica glass soot particles consist essentially of fused silica with titanium dopant and the consolidated glass body structure consists essentially of fused silica homogeneously doped with titanium dopant and has a homogeneous CTE in the range of +20 ppb/° C. to −20 ppb/° C. at 20–26° C.

The invention provides a method for forming substantially striae-free glass such as is preferred for use in extreme ultraviolet lithography.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for forming an EUV lithography glass substrate, comprising:
   homogeneously mixing a plurality of titanium doped silica glass particles, a binder, a lubricant and a solvent to provide a homogeneous mixture;
   extruding the mixture through an extrusion slit into a solid pre-form;
   purifying the pre-form by heating the perform in a chlorine atmosphere;
   purging with an inert purge gas;
   oxygenating in the presence of an oxygen containing purge gas; and
   heating the pre-form to consolidate the pre-form into a full density, substantially striae-free titanium doped solid glass having a homogeneous CTE.

2. The method as defined in claim 1 wherein said silica particles have a titanium dopant weight percent level within the range from about 6 wt. % $TiO_2$ to about 9 wt. % $TiO_2$ and said full density titanium doped glass has a homogeneous titanium dopant level, said homogeneous titanium dopant level in the range from 6 wt. % $TiO_2$ to about 9 wt. % $TiO_2$.

3. The method as defined in claim 1 wherein said silica particles have a titanium dopant weight percent level within the range from about 6 to 8 wt. % $TiO_2$ and said full density titanium doped glass has a homogeneous titanium dopant level, said homogeneous titanium dopant level in the range from 6 to 8 wt. % $TiO_2$.

4. The method as claimed in claim 1 wherein said homogeneous titanium dopant level is 6.8 to 7.5 wt. % $TiO_2$.

5. The method as claimed in claim 1 wherein said homogeneous CTE is in the range of +10 ppb/° C. to −10 ppb/° C. at 20–26° C.

6. The method as claimed in claim 5 wherein said CTE has a variation in coefficient of thermal expansion $\leq 10$ ppb/° C.

7. The method as claimed in claim 6 wherein said CTE has a variation in coefficient of thermal expansion $\leq 5$ ppb/° C.

8. A method for forming a void-free geometry glass substrate, comprising:
   homogeneously mixing a mixture of titanium doped silica glass particles, binder, lubricant and solvent;
   extruding the mixture through an extrusion slit into a solid void-free pre-form; and
   purifying the pre-form by heating the perform in a chlorine atmosphere;
   purging with an inert purge gas;
   oxygenating in the presence of an oxygen containing purge gas; and
   heating the pre-form to consolidate the pre-form into a full density, substantially striae-free titanium doped solid glass having a homogeneous CTE with said homogeneous CTE in the range of +20 ppb/° C. to −20 ppb/° C. at 20–26° C.

9. The method as defined in claim 8 wherein said silica particles have a titanium dopant weight percent level within the range from about 6 wt. % $TiO_2$ to about 9 wt. % $TiO_2$ and said full density titanium doped glass has a homogeneous titanium dopant level, said homogeneous titanium dopant level in the range from 6 wt. % $TiO_2$ to about 9 wt. % $TiO_2$.

10. The method as defined in claim 8 wherein said silica particles have a titanium dopant weight percent level within the range from about 6 to 8 wt. % $TiO_2$ and said fill density titanium doped glass has a homogeneous titanium dopant level, said homogeneous titanium dopant level in the range from 6 to 8 wt. % $TiO_2$.

11. The method as claimed in claim 8 wherein said homogeneous titanium dopant level is 6.8 to 7.5 wt. wt. % $TiO_2$.

12. The method as claimed in claim 8 wherein said homogeneous CTE is in the range of +10 ppb/° C. to −10 ppb/° C. at 20–26° C.

13. The method as claimed in claim 8 wherein said CTE has a variation in coefficient of thermal expansion $\leq 10$ ppb/° C.

14. The method as claimed in claim 13 wherein said CTE has a variation in coefficient of thermal expansion $\leq 5$ ppb/° C.

15. A method for forming an EUV lithography photomask glass substrate, comprising:

forming a mixture of a silica soot with a titanium dopant weight percent level within the range from 6 wt. % $TiO_2$ to 9 wt. % $TiO_2$, a binder, a lubricant and a solvent;

extruding the mixture to provide a flat planar pre-form;

oxygenating the pre-form; and consolidating the flat planar pre-form in a vacuum to provide a consolidated flat planar silica glass substrate with a titanium dopant weight percent level within the range from 6 wt. % $TiO_2$ to 9 wt. % $TiO_2$ to provide an EUV lithography photomask glass substrate having a CTE in the range of +20 ppb/° C. to −20 ppb/° C. at 20–26° C.

16. The method as claimed in claim 15 including hot isostatic pressing said consolidated flat planar silica glass substrate to provide an EUV lithography photomask glass substrate free of gaseous defect inclusions.

17. A method for forming an EUV lithography glass substrate, comprising:

forming a homogeneous mixture of silica soot comprising titanium dopant;

extruding the mixture into a pre-form;

oxidizing trivalent titanium in the dopant by heating the pre-form in an oxidizing atmosphere; and heating the pre-form to consolidate the pre-form into a full density, substantially striae-free glass.

18. The method as defined in claim 17 further comprising drying the pre-form prior to heating the pre-form to consolidate.

19. The method as defined in claim 17 wherein the silica soot is formed by flame hydrolysis.

20. The method as defined in claim 17 wherein the titanium dopant forms a weight fraction of the silica soot in a range of about one to ten percent.

21. A method for forming an EUV lithography glass substrate, comprising: homogeneously mixing a plurality of titanium doped silica glass particles to provide a homogeneous mixture;

extruding the mixture through an extrusion slit into a solid pre-form; and drying, purifying in a chlorine atmosphere and oxygenating the pre-form; and heating the pre-form to consolidate the pre-form into a fall density, substantially striae-free titanium doped solid glass having a homogeneous CTE.

22. The method as defined in claim 21 wherein said silica particles have a titanium dopant weight percent level within the range from about 6 wt. % $TiO_2$ to about 9 wt. % $TiO_2$ and said full density titanium doped glass has a homogeneous titanium dopant level, said homogeneous titanium dopant level in the range from 6 wt. % $TiO_2$ to about 9 wt. % $TiO_2$.

23. The method as defined in claim 21 wherein said silica particles have a titanium dopant weight percent level within the range from about 6 to 8 wt. % TiO.sub.2 and said full density titanium doped glass has a homogeneous titanium dopant level, said homogeneous titanium dopant level in the range from 6 to 8 wt. % $TiO_2$.

24. The method as claimed in claim 21 wherein said homogeneous titanium dopant level is 6.8 to 7.5 wt. % $TiO_2$.

25. The method as claimed in claim 21 wherein said homogeneous CTE is in the range of +10 ppb/° C. to −10 ppb/° C. at 20–26° C.

26. The method as claimed in claim 25 wherein said CTE has a variation in coefficient of thermal expansion ≦10 ppb/° C.

27. The method as claimed in claim 26 wherein said CTE has a variation in coefficient of thermal expansion ≦5 ppb/° C.

28. A method for forming a void-free geometry glass substrate, comprising: homogeneously mixing a mixture of titanium doped silica glass particles;

extruding the mixture through an extrusion slit into a solid void-free pre-form;

drying, purifying in a chlorine atmosphere and oxygenating the pre-form; and heating the pre-form to consolidate the pre-form into a full density, substantially striae-free titanium doped solid glass having a homogeneous CTE with said homogeneous CTE in the range of +20 ppb/° C. to −20 ppb/° C. at 20–26° C.

29. The method as defined in claim 28 wherein said silica particles have a titanium dopant weight percent level within the range from about 6 wt. % $TiO_2$ to about 9 wt. % $TiO_2$ and said full density titanium doped glass has a homogeneous titanium dopant level, said homogeneous titanium dopant level in the range from 6 wt. % $TiO_2$ to about 9 wt. % $TiO_2$.

30. The method as defined in claim 28 wherein said silica particles have a titanium dopant weight percent level within the range from about 6 to 8 wt. % $TiO_2$ and said full density titanium doped glass has a homogeneous titanium dopant level, said homogeneous titanium dopant level in the range from 6 to 8 wt. % $TiO_2$.

31. The method as claimed in claim 28 wherein said homogeneous titanium dopant level is 6.8 to 7.5 wt. wt. % $TiO_2$.

32. The method as claimed in claim 28 wherein said homogeneous CTE is in the range of +10 ppb/° C. to −10 ppb/° C. at 20–26° C.

33. The method as claimed in claim 28 wherein said CTE has a variation in coefficient of thermal expansion ≦10 ppb/° C.

34. The method as claimed in claim 33, wherein said CTE has a variation in coefficient of thermal expansion ≦5 ppb/° C.

35. A method for forming an EUV lithography photomask glass substrate, comprising:

forming a mixture of a silica soot with a titanium dopant weight percent level within the range from 6 wt. % $TiO_2$ to 9 wt. % $TiO_2$, extruding the mixture to provide a flat planar pre-form;

oxygenating the pre-form; and consolidating the flat planar pre-form in a vacuum to provide a consolidated flat planar silica glass substrate with a titanium dopant weight percent level within the range from 6 wt. % $TiO_2$ to 9 wt. % $TiO_2$ to provide an EUV lithography photomask glass substrate having a CTE in the range of +20 ppb/° C. to −20 ppb/° C. at 20–26° C.

36. The method as claimed in claim 35 including hot isostatic pressing said consolidated flat planar silica glass substrate to provide an EUV lithography photomask glass substrate free of gaseous defect inclusions.

* * * * *